US008402985B2

(12) United States Patent
Schmalfuss

(10) Patent No.: US 8,402,985 B2
(45) Date of Patent: Mar. 26, 2013

(54) THERMAL RELEASE ELEMENT FOR SPRINKLERS, VALVES OR THE LIKE

(75) Inventor: Tino Schmalfuss, Hamburg (DE)

(73) Assignee: Job Lizenz GmbH & Co. KG, Ahrensburg (DE)

( * ) Notice: Subject to any disclaimer, the term of this patent is extended or adjusted under 35 U.S.C. 154(b) by 140 days.

(21) Appl. No.: 12/759,349

(22) Filed: Apr. 13, 2010

(65) Prior Publication Data

US 2010/0307605 A1 Dec. 9, 2010

(30) Foreign Application Priority Data

Jun. 5, 2009 (DE) ..................... 20 2009 007 987 U

(51) Int. Cl.
*F16K 17/14* (2006.01)

(52) U.S. Cl. ............................... 137/72; 137/67; 169/38

(58) Field of Classification Search .................... 137/72, 137/67; 169/38
See application file for complete search history.

(56) References Cited

U.S. PATENT DOCUMENTS

| | | | | |
|---|---|---|---|---|
| 1,905,676 | A * | 4/1933 | Barclay | 169/38 |
| 2,185,422 | A * | 1/1940 | Prutton et al. | 236/99 R |
| 3,484,146 | A * | 12/1969 | Germin et al. | 445/53 |
| 3,798,092 | A * | 3/1974 | Runge et al. | 149/89 |
| 4,018,164 | A * | 4/1977 | Breed et al. | 102/236 |
| 4,938,294 | A | 7/1990 | Mohler et al. | |
| 5,967,238 | A | 10/1999 | Pepi et al. | |
| 2007/0207354 | A1* | 9/2007 | Curello et al. | 429/25 |

FOREIGN PATENT DOCUMENTS

| | | | |
|---|---|---|---|
| DE | 3601203 | | 3/1987 |
| DE | 19780041 | | 2/2002 |
| EP | 0838242 | | 4/1998 |
| JP | 2009119240 | * | 6/2009 |
| WO | 8806046 | | 8/1988 |
| WO | 9726945 | | 7/1997 |

OTHER PUBLICATIONS

Translation of JP 2009119240 , Published Jun. 4, 2009.*

* cited by examiner

*Primary Examiner* — Kevin Lee
*Assistant Examiner* — Macade Brown
(74) *Attorney, Agent, or Firm* — Sand & Sebolt

(57) ABSTRACT

A thermal release element for valves in the form of a completely enclosed inner space with a container filled with a release liquid in which the release liquid contains a hydrocarbon selected from one of the following substance groups or containing a mixture of the hydrocarbons of an aliphatic bromide, a hydrocarbon with a nitro group, a singly halogenated benzene ring, and an aliphatic ester compound with two double-bonded oxygen atoms.

13 Claims, 1 Drawing Sheet

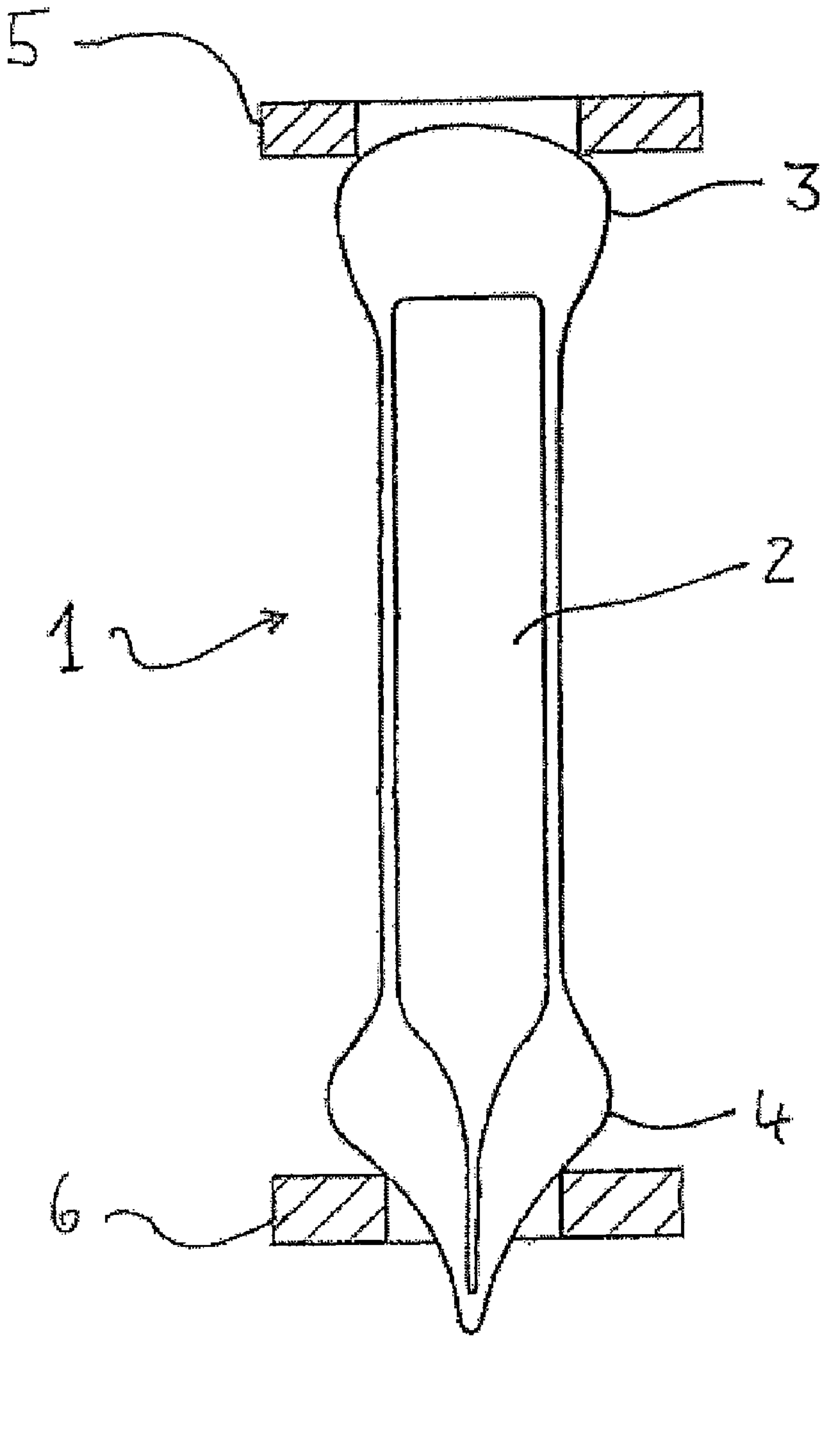
5
3
2
1
4
6

THERMAL RELEASE ELEMENT FOR SPRINKLERS, VALVES OR THE LIKE

CROSS REFERENCE TO RELATED APPLICATION

This application claims priority from German Utility Model No. DE 20 2009 007 987.2 filed Jun. 5, 2009; the disclosure of which is incorporated herein by reference.

BACKGROUND OF THE INVENTION

1. Technical Field

The invention relates to a thermal release element for sprinklers, valves or the like in the form of a completely enclosed inner space with a container filled with a release liquid.

2. Background Information

The designing of thermal release elements for sprinklers but also for other valves, e.g., for emergency discharge valves of gas containers in the form of containers comprising in their interior a completely enclosed hollow space filled with a release liquid has long been known. These containers are usually formed from glass and can also be designated as small glass casks.

Such small glass casks as thermal release element are described, for example, in DE 36 01 203 A1.

Such release elements are filled with a release liquid that expands upon being heated and result in the bursting of the container typically fixed in a valve seat and holding the valve in closed position so that a release of the valve or the like takes place.

Various substances have been suggested as release liquids. Thus, U.S. Pat. No. 4,938,294 cites toluene, xylene, trichloroethylene, tetrachloroethylene and mixtures of them as suitable release liquids. EP 0 838 242 B1 cites a halogen derivative of an aromatic hydrocarbon with two or more halogen substituents, an aliphatic amide as well as mixtures of them as suitable release liquids.

Finally, DE 197 80 041 C1 describes a substance derived from a halogen-free or halogenated hydrocarbon as a suitable release liquid in which in its structural formula a)

i) at least one $CH_2$ group is replaced by oxygen (O), sulfur (S), sulfinyl (SO) or sulfonyl ($SO_2$), or ii) at least one CH group is replaced by nitrogen, b) no hydrogen atoms directly bonded to oxygen, nitrogen or sulfur occur, c)

i) at least one ring occurs, or ii) at least two oxygen atoms, each with two single bonds, occur, or iii) at least two carbonyl groups of ketones and/or aldehydes occur, or iv) at least one oxidized sulfur atom (SO or $SO_2$) occurs, or v) at least one nitrogen atom in the form of an amide, imide, imine or nitrile is present.

All the cited release liquids have proven themselves in principle and are basically suitable for being used in generic release elements. However, there is a continuing need for improvements, in particular under the following viewpoints:

Thus, the requirements for modern release elements have risen as regards the precision of the release temperature, and there is therefore a need for highly temperature-sensitive release liquids that are suitable for an exact and reproducible adjustment of the release temperature in the range of a few degrees Celsius. In addition, many of the previously used release liquids are damaging to health, to the environment or even combustible.

BRIEF SUMMARY OF THE INVENTION

The concern here is to create relief with the invention and to indicate a possibility of a replacement for the release liquid, which release liquid should allow on the one hand a highly temperature-precise and temperature-sensitive release of the release element equipped with it and on the other hand should offer a reduced danger to health and to the environment in contrast to the state of the art, thus making the processing less dangerous.

During the search for possible alternatives the inventors carried out comprehensive tests and examinations and finally hit upon the groups of hydrocarbons cited in claim 1 from which individual substances can be selected and used for processing to a release liquid as well as mixtures of substances from these groups.

These groups comprise aliphatic bromides, hydrocarbons with a nitro group, singly halogenated benzene rings and aliphatic ester compounds with two double-bonded oxygen atoms.

In particular, the aliphatic bromides can be halogenated twice.

The individual substance groups are distinguished as follows:

Aliphatic bromides have a very high density that allows, in combination with the low thermal capacity, very rapid release times and narrow temperature fields of the release elements provided with them. This also applies in particular to the especially preferred, doubly halogenated aliphatic bromides.

Aliphatic bromides improve the response sensitivity of otherwise structurally equivalent thermal release elements in comparison to release liquids currently customary today by about 15%. Even the standard deviation of the release temperature field is improved by 15% in comparison to traditional release liquids.

Nitro compounds have a high coefficient of tension and a high thermal capacity due to their $NO_2$ structure. Furthermore, they have a low dynamic viscosity, as a result of which the small density and the rather high thermal capacity, that are otherwise disadvantageous as regards the release time, can be compensated. Thus, even such substances result in rapid release times and also allow the selection of narrow temperature fields.

Cyclic molecules, that already have in any case good properties as release liquid, have as benzene rings with maximally one halogen high coefficients of tension and a low thermal capacity, which again results in rapid release times and narrow temperature fields.

Finally, aliphatic ester compounds with two double-bonded oxygen atoms again allow very narrow temperature fields and still have good release times even though not to the extent of the previously cited substance groups. They are suitable on account of the high boiling point in particular for being used in thermal release elements with a high release temperature.

The release properties of the thermal release elements can be determined, that is, shaped in a controlled manner by the selection of mixtures of substances from the cited substance groups.

Additives, in particular one or more dyes, can advantageously be added to the release liquid. Since most of the selected release elements are transparent without dye, the addition of a dye facilitates not only in the quality control, e.g., the recognition of a gas bubble purposely left in the inner space and an estimation of the size of it, but the codings for different release temperatures that are known in the state of the art and already used can be indicated by the addition of different dyes.

Further advantages and features of the invention result from the following description of an exemplary embodiment, with reference made to the attached FIGURE, that schematically shows a release element fixed between two support elements and filled in a manner accordance with the invention with a described and claimed release liquid.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

The FIGURE illustrates a release element fixed between two support elements and filled in a manner accordance with the invention with a described and claimed release liquid.

DETAILED DESCRIPTION OF THE INVENTION

The release element shown in the FIGURE is a small glass cask 1 as it is basically known from the state of the art. Thus, the small glass cask shown here corresponds in its design substantially to the form and shape described in DE 36 01 203. The small glass cask completely encloses a hollow inner space 2 and rests in its use as release element with opposing ends 3, 4 on support elements 5, 6 and is fixed between the latter. One of the support elements, e.g., the support element 5, can be a valve plate of a sprinkler and the other support element, e.g., the support element 6, can be a support bracket opposite it, as is frequently found in sprinkler systems. Likewise, small glass cask 1 can also, however, be bound as thermal release element into an emergency discharge valve of a gas container or in similar devices.

The most important part of the invention is the release liquid filled into the inner space 2, which results upon heating due to the thermal expansion to a bursting of small glass cask 1 and therewith to a release of the thermal release device. Typically, as is also known from the state of the art, the release liquid is filled into the inner space leaving a defined gas bubble (usually air), which gas bubble absorbs the first thermal expansion of the release liquid until an explosion-like expansion takes place, in particular by a phase transition, that allows small glass cask 1 to burst. According to the invention the release liquid in the interior of inner space 2 contains at least one hydrocarbon consisting of an aliphatic bromide, preferably a doubly halogenated aliphatic bromide, a hydrocarbon with a nitro group, a benzene ring halogenated once and an aliphatic ester compound with two doubly bonded oxygen atoms, or a mixture of different hydrocarbons from one or more of these groups. The release liquid can merely contain these hydrocarbons but consists, however, in particular completely of one or more of the cited hydrocarbons.

Examples of hydrocarbons from the cited groups suitable in a manner in accordance with the invention for use for the release liquid result from the following table:

| Substance group | Examples | | |
|---|---|---|---|
| Aliphatic bromides, e.g., halogenated two times | | 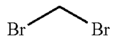 Dibromomethane | |
| Nitro group | 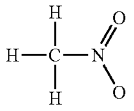 Nitromethane | 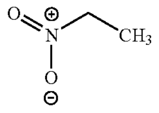 Nitroethane | 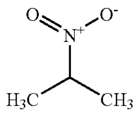 1-nitropropane |
| Benzene ring halogenated once | 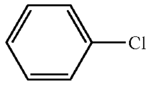 Chlorobenzene | 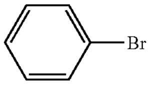 Bromobenzene | 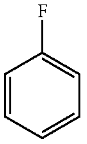 Fluorobenzene |
| Aliphatic ester compounds with 2 double-bonded oxygen atoms | 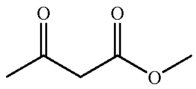 Methylacetoacetate | 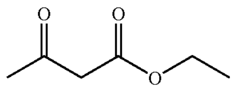 Ethelacetoacetate | |

Considerable advantages over the state of the art are associated with the selection of an appropriate release liquid which reside in particular in the precise ability to adjust a release temperature, in closely adjustable temperature windows for the release as well as in the increase of the response sensitivity.

The release liquid can be compounded with additives, in particular one or more dyes. Since most of the selected release liquids are transparent without dye, the addition of a dye not only facilitates the recognition of the desired gas bubble and the estimating of its size in the quality control but the addition of different dyes can indicate the codings for different release temperatures known in the state of the art and already being used.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

LIST OF REFERENCE NUMBERS

1 Small glass cask
2 Inner space
3 End
4 End
5 Support element
6 Support element

The invention claimed is:

1. A thermal release element for valves in the form of a container having:

a wall;

an inner spaced bounded and defined by the wall; and a temperature sensitive release liquid disposed within the inner space, wherein the release liquid expands under rising temperatures and upon reaching a release temperature causes the wall to burst, thereby opening the valve; and wherein the release liquid contains a hydrocarbon selected from the group consisting of an aliphatic bromide, a hydrocarbon with a nitro group, and an aliphatic ester compound with two double-bonded oxygen atoms.

2. The thermal release element according to claim 1, wherein the release liquid is a doubly halogenated aliphatic bromide or is a liquid mixture that contains a doubly halogenated aliphatic bromide.

3. The thermal release element according to claim 2, wherein the release liquid contains additives one or more dyes.

4. The thermal release element according to claim 1, wherein the release liquid contains one or more dyes.

5. The thermal release element according to claim 1, wherein the wall of the container is manufactured from glass.

6. A thermo-sensitive valve comprising:

a valve body having a first support and a second support;

a gap defined between the first and second supports;

a thermal release element engageable with the valve body and spanning the gap to hold the valve in a closed position; and wherein the thermal release element comprises:

a housing having a first end and a second end; wherein the first end of the housing engages the first support of the valve body and the second end of the housing engages the second support of the valve body;

an inner space defined in the housing; and a release liquid retained within the inner space; wherein the release liquid contains a hydrocarbon selected from the group consisting of an aliphatic bromide, a hydrocarbon with a nitro group, and an aliphatic ester compound with two double-bonded oxygen atoms; and wherein the release liquid expands upon heating, and when a predetermined release temperature is reached, the expanded release liquid causes the housing to burst and thereby opens the valve.

7. The thermo-sensitive valve as defined in claim 6, further including a gas bubble disposed within the release liquid in the inner space of the housing.

8. The thermo-sensitive valve as defined in claim 6, wherein the housing of the thermal release element is made from glass.

9. The thermo-sensitive valve as defined in claim 6, wherein the first end of the housing is fixedly engaged with the first support and the second end of the housing is fixedly engaged with the second support.

10. The thermo-sensitive valve as defined in claim 6, wherein the release liquid is a doubly halogenated aliphatic bromide or is a liquid mixture that contains a doubly halogenated aliphatic bromide.

11. The thermo-sensitive valve according to claim 10, wherein the release liquid contains one or more dyes.

12. The thermo-sensitive valve according to claim 6, wherein the valve body is a sprinkler valve body adapted for use in a sprinkler system, wherein the first support is a sprinkler valve plate and the second support is a sprinkler support bracket.

13. The thermo-sensitive valve according to claim 6, wherein the valve body is an emergency discharge valve adapted for use in a gas container.

* * * * *